United States Patent
Kim

(10) Patent No.: US 7,265,774 B2
(45) Date of Patent: Sep. 4, 2007

(54) COLLIMATING LENS OF BEAM SCANNING APPARATUS

(75) Inventor: Hyung-soo Kim, Suwon (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 141 days.

(21) Appl. No.: 10/652,487

(22) Filed: Sep. 2, 2003

(65) Prior Publication Data

US 2004/0046862 A1   Mar. 11, 2004

(30) Foreign Application Priority Data

Sep. 5, 2002  (KR) ............... 2002-53629

(51) Int. Cl.
  *B41J 27/00* (2006.01)
(52) U.S. Cl. .................. 347/244; 347/258
(58) Field of Classification Search ......... 347/134, 347/137, 241–244, 256–261, 230; 250/363.1; 359/204, 206, 664, 641–642, 648, 653
See application file for complete search history.

(56) References Cited

U.S. PATENT DOCUMENTS

| 4,758,071 A | * | 7/1988 | McLaughlin et al. ....... 359/653 |
| 6,005,703 A | * | 12/1999 | Maddox et al. ............. 359/206 |
| 6,067,182 A | * | 5/2000 | Narisawa ..................... 359/204 |
| 6,172,787 B1 | * | 1/2001 | Naiki ........................... 359/204 |
| 6,489,982 B2 | * | 12/2002 | Ishibe ......................... 347/134 |

* cited by examiner

*Primary Examiner*—Hai Pham
(74) *Attorney, Agent, or Firm*—Staas & Halsey LLP

(57) ABSTRACT

A beam scanning apparatus having a collimating lens in which a beam emitted from a light source is transformed into at least one of a convergent beam and a parallel beam with respect to an optical axis and outputted towards a slit. The collimating lens being one sheet of a spherical surface lens satisfying the relationship:

$$-0.3 < \frac{R2}{R1} < -0.1$$
$$0.05 < \frac{d}{f} < 0.5$$

in which, R1 denotes a curvature radius of a first surface of the collimating lens opposing the light source, R2 denotes a curvature radius of a second surface of the collimating lens opposing the slit, d denotes a center thickness of the collimating lens, and f denotes a focal length from the collimating lens to the light source. By virtue of the structure of the beam scanning apparatus using the collimating lens, deteriorating printing quality due to temperature change is prevented and cost can be saved.

16 Claims, 5 Drawing Sheets

COLLIMATING LENS OF BEAM SCANNING APPARATUS

CROSS-REFERENCE TO RELATED APPLICATIONS

This application claims the benefit of Korean Application No. 2002-53629, filed Sep. 5, 2002, in the Korean Intellectual Property Office, the disclosure of which is incorporated herein by reference.

BACKGROUND OF THE INVENTION

1. Field of the Invention

The present invention relates to a beam scanning apparatus, and more particularly, to a beam scanning apparatus comprising a collimating lens consisting of one sheet of a spherical surface.

2. Description of the Related Art

Generally, a laser printer prints an image on printing paper using a laser beam scanning apparatus. The beam scanning apparatus focuses light beams emitted from laser diodes onto a photosensitive drum according to an image signal, thereby forming a latent image on the photosensitive drum. The latent image is printed on the printing paper in a visible image.

The beam scanning apparatus comprises a collimating lens for transforming the light beam emitted from the laser diode into a parallel beam or a convergent beam. In order to improve utilization of the light beam emitted from the laser diode, the collimating lens is designed to have a large numerical aperture (NA) which varies in value depending on a main scanning direction and a sub-scanning direction.

Conventional collimating lenses use an aspherical surface lens made of a plastic so as to achieve a compact-sized and cost-saving beam scanning apparatus. However, conventional collimating lenses vary in refractivity with temperature changes in the beam scanning apparatus, causing the image spot to change.

Also, conventional collimating lenses adjust a wavefront aberration through the combination of one sheet of a spherical surface lens and one sheet of an aspherical surface lens or through one sheet of aspherical surface glass lens. However, while such collimating lenses are capable of adjusting the wavefront aberration, they are accompanied with increased fabrication cost.

SUMMARY OF THE INVENTION

An aspect of the present invention is to provide a beam scanning apparatus comprising a collimating lens capable of preventing deteriorating printing quality caused by temperature changes and obtaining cost reduction effect.

The above aspects and/or features of the present invention are achieved by a beam scanning apparatus including a collimating lens in which a beam emitted from a light source is transformed into at least one of a convergent beam and a parallel beam with respect to an optical axis and outputted towards a slit. The collimating lens being one sheet of a spherical surface lens satisfying:

$$-0.3 < \frac{R2}{R1} < -0.1$$

$$0.05 < \frac{d}{f} < 0.5$$

in which, R1 denotes a curvature radius of a first surface of the collimating lens opposing the light source, R2 denotes a curvature radius of a second surface of the collimating lens opposing the slit, d denotes a center thickness of the collimating lens, and f denotes a focal length from the collimating lens to the light source.

The collimating lens has a positive refractive power, and is made of glass.

The slit is formed in an elliptical shape having a larger diameter in a main scanning direction than in a sub-scanning direction.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other the other aspects and advantages of the invention become apparent and more readily appreciated from the following description of the preferred embodiment taken in conjunction with reference to the accompanying drawings in which.

DETAILED DESCRIPTION OF THE PREFERRED EMBODIMENT

Figure 1:
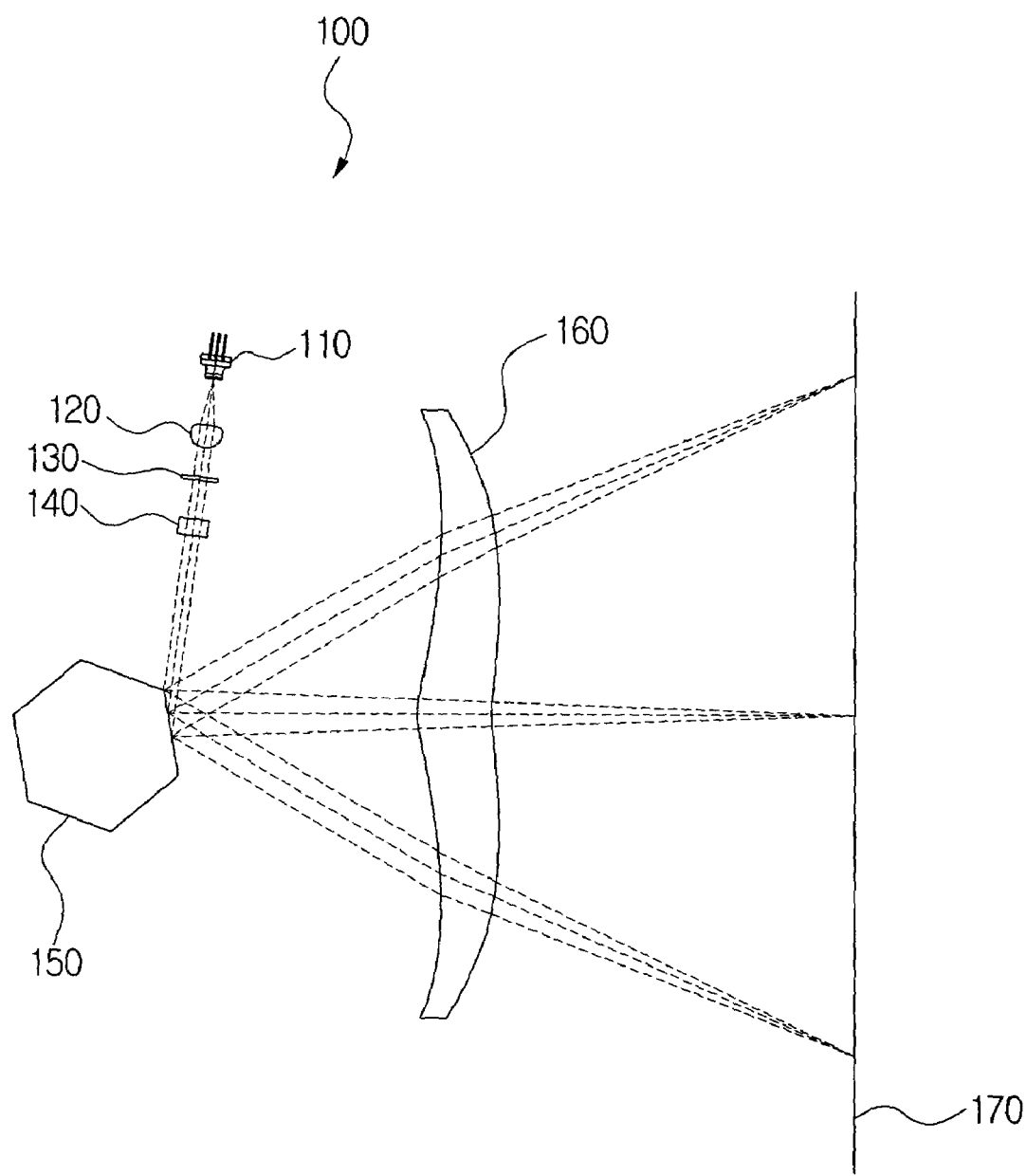
FIG. 1 is a view schematically showing a beam scanning apparatus comprising a collimating lens according to an embodiment of the present invention.

Reference will now be made in detail to the present preferred embodiment of the present invention, examples of which are illustrated in the accompanying drawings, wherein like reference numerals refer to the like elements throughout. The embodiments are described below in order to explain the present invention by referring to the figures.

FIG. 1 is a view schematically showing a beam scanning apparatus comprising a collimating lens according to an embodiment of the present invention.

Referring to FIG. 1, a beam scanning apparatus 100 includes a laser diode 110, a collimating lens 120, a slit panel 130, a cylinder lens 140, a polygon mirror 150, an f-theta lens 160, and a photosensitive drum 170.

The laser diode 110 is a light source that emits light beams. The beams emitted from the laser diode 110 are transformed into parallel beams with respect to an optical axis or convergent beams through the collimating lens 120. The collimating lens 120 comprises one sheet of a spherical surface lens having a positive refractive power, and preferably, it is made of glass.

Figure 2:
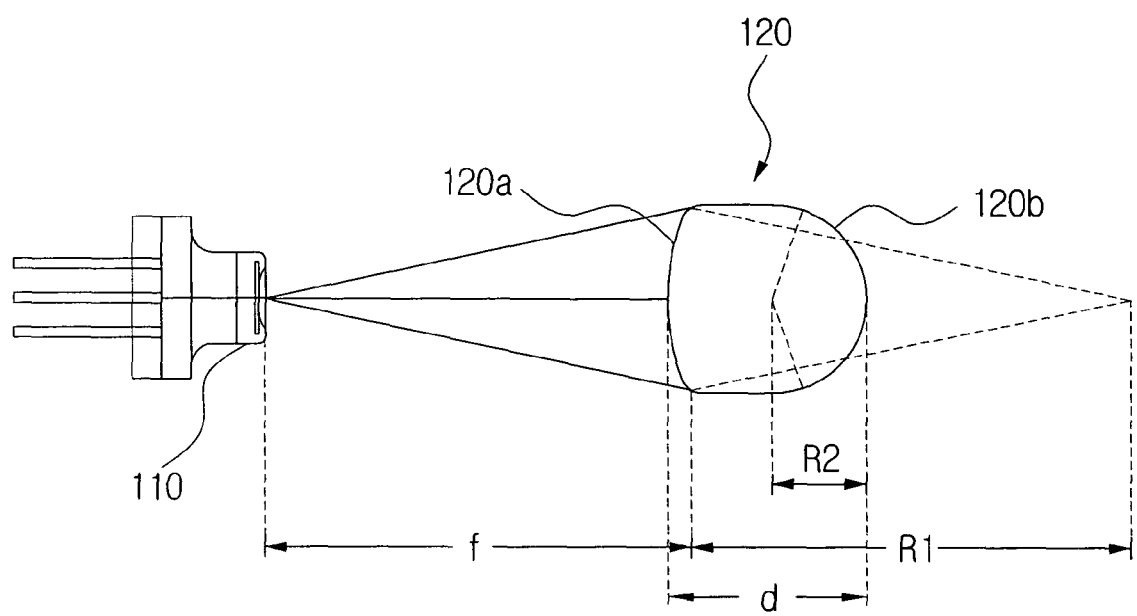
FIG. 2 is an enlarged cross sectional view of the collimating lens of FIG. 1.

FIG. 2 is an enlarged cross sectional view of the collimating lens 120 of FIG. 1.

Referring to FIG. 2, the collimating lens 120 has a first surface 120a and a second surface 120b. The first surface 120a refers to an incident surface to which the beams emitted from the laser diode 110 enter, and the second surface 120b is an emergent surface from which the transformed incident beams, i.e., either the parallel beams or the convergent beams, emerge.

The collimating lens 120 satisfies the following conditions:

$$-0.3 < \frac{R2}{R1} < -0.1$$

$$0.05 < \frac{d}{f} < 0.5$$

in which, "R1" denotes a curvature radius of the first surface 120a of the collimating lens 120 opposing the laser diode 110, and "R2" denotes a curvature radius of the second surface 120b of the collimating lens 120 opposing the slit panel 130, which will be described later.

The center thickness, "d" denotes a center thickness of the collimating lens 120, i.e., it denotes a distance from a center of the first surface 120a to a center of the second surface 120b. The focal length "f" is a focal length from the collimating lens 120 to the laser diode 110. Generally, the focal length is calculated with a curvature and a thickness of a lens. The focal length as shown in the drawings indicates a general focal length and is variable.

Figure 3A:
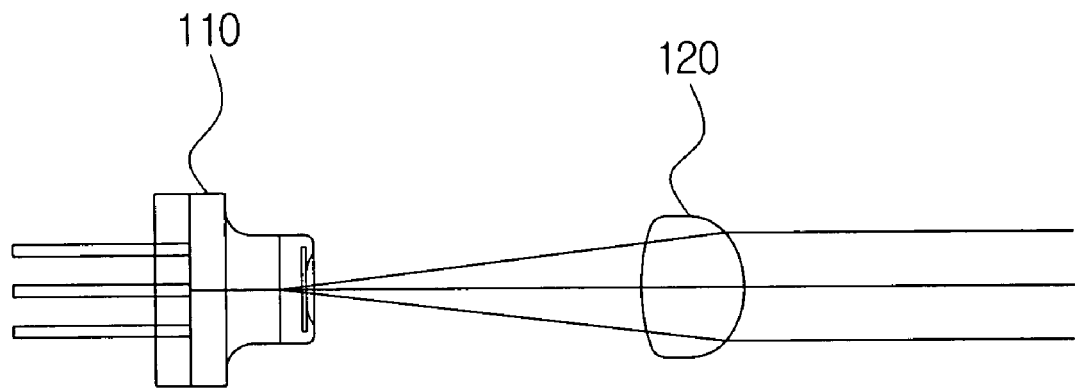
FIG. 3A is a view showing light paths of the beams that pass through the collimating lens of FIG. 1 in a main scanning direction.
Figure 3B:
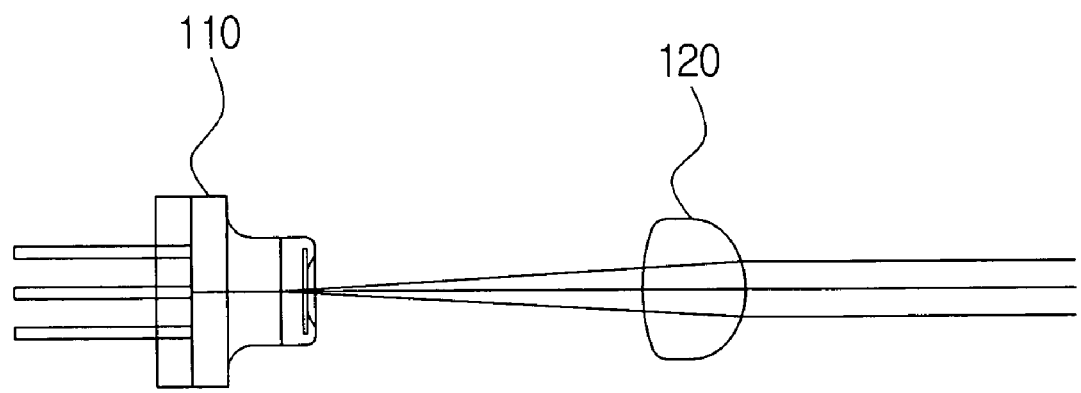
FIG. 3B is a view showing light paths of the beams that pass through the collimating lens of FIG. 1 in a sub-scanning direction.

Among the beams passing through the collimating lens 120, beams with respect to a main scanning direction have light paths as illustrated in FIG. 3A, while the light paths of beams with respect to a sub-scanning direction are illustrated in FIG. 3B. The beams with respect to the main scanning direction and the sub-scanning direction are transformed into parallel beams with respect to an optical axis or convergent beams which are incident on the slit panel 130.

Figure 4:
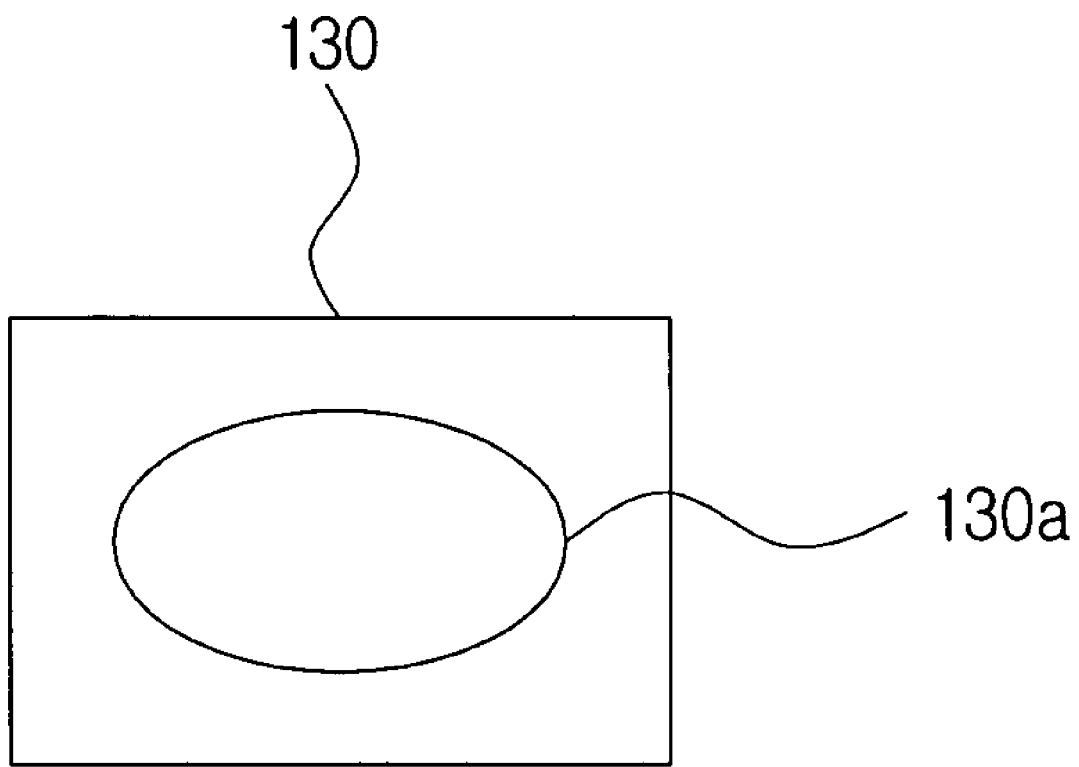
FIG. 4 is a view showing an opening formed in the slit panel of FIG. 1.

The slit panel 130 opposes the second surface 120b of the collimating lens 120. As shown in FIG. 4, the slit panel 130 has a slit 130a which limits a size of a beam section of the beams passing through the collimating lens 120. Preferably, the slit 130a is formed in an elliptical shape that has a larger diameter in a main scanning direction than in a sub-scanning direction. Alternatively, the slit 130a may be formed in a circular shape.

As the beams from the collimating lens 120 pass through the cylinder lens 140, the beams are transformed into linear shapes which are horizontal with respect to the sub-scanning direction. The polygon mirror 150 moves the horizontal linear beams from the cylinder lens 140 at a constant linear velocity for scanning. The polygon mirror 150 is provided with a motor (not shown) for rotating the polygon mirror 150 at a constant velocity.

The f-theta (fθ) lens 160 has a constant refractivity with respect to the optical axis and refracts the beams of equal speed reflected from the polygon mirror 150 in the main scanning direction. Also, the f-theta (fθ) lens 160 adjusts aberration of the beams deflected from the polygon mirror 150 and guides the beams towards the photosensitive drum 170. Accordingly, image data is formed on the recording medium, i.e., on the photosensitive drum 170.

Referring to table 1, dimensions of the optical elements of FIG. 1 will be described.

Table 1 shows the dimensions of the laser diode (LD), the LD cover glass, and the collimating lens employed in the beam scanning apparatus of FIG. 1

| Optical element | Curvature radius | Interplanar spacing | Refractivity |
|---|---|---|---|
| Laser Diode (LD) | Infinity | 0.xxx | 1.0 |
| LD cover glass first surface | Infinity | 0.25 | 1.xxx |
| LD cover glass second surface | Infinity | 13.xxx | 1.0 |
| Collimating lens first surface | R1 = 36.xxx | 3.xxx | 1.xxx |
| Collimating lens second surface | R2 = −9.xxx | 3.xxx | 1.0 |
| Slit | Infinity | — | — |

In Table 1, the "interplanar spacing" refers to a distance between planes of the optical elements, and figures represented by 'xxx' range from 000 to 999. The focal length "f" of the collimating lens 120 is 15.xxx mm, the diameter of the slit 130a of the slit panel 130 in the main-scanning direction is 3.xxx mm, and the diameter of the slit 130a in the sub-scanning direction is 1.xxx mm.

Figure 5:
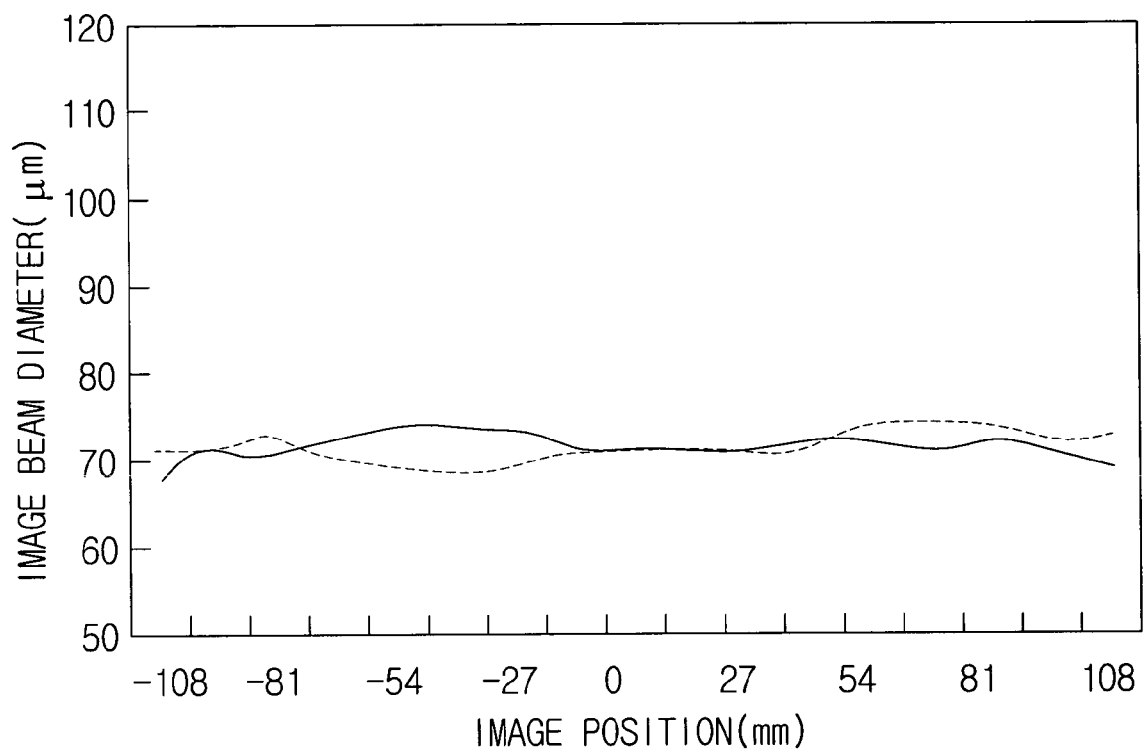
FIG. 5 is a graph showing an image beam diameter of the image spot formed on the photosensitive drum of the beam scanning apparatus of FIG. 1.

FIG. 5 is a graph showing an image beam diameter of an image that is formed on the photosensitive drum of the beam scanning apparatus of FIG. 1.

Referring to FIG. 5, the position of an image on the A4 paper is represented with reference to the center being set as 0. The image beam diameter corresponds to the size of an image spot formed on the photosensitive drum 170 which is measured in the main scanning direction and the sub-scanning direction. The image beam diameter measured in the main scanning direction is represented by a solid line, and the image beam diameter measured in the sub-scanning direction is represented by a dotted line.

As shown in FIG. 5, the beam scanning apparatus 100 having the dimensions of the table 1 and as described above offers performance which is applicable in a laser printer of ranging from 300 dpi (dot per inch) to 600 dpi.

The beam scanning apparatus 100 according to the present invention uses the spherical collimating lens comprising one sheet of glass, thus achieving a compact-sized and cost-saving beam scanning apparatus. Also, the use of the collimating lens fabricated with glass prevents printing quality deterioration due to the temperature change.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A beam scanning apparatus, comprising a collimating lens in which a beam emitted from a light source is transformed into at least one of a convergent beam and a parallel beam with respect to an optical axis and outputted towards a slit, the collimating lens being one sheet of a spherical surface lens satisfying the relationship:

$$-0.3 < \frac{R2}{R1} < -0.1$$
$$0.05 < \frac{d}{f} < 0.5$$

in which, R1 denotes a curvature radius of a first surface of the collimating lens opposing the light source and having a first positive constant refractive index, R2 denotes a curvature radius of a second surface of the collimating lens opposing the slit and having a second positive constant refractive index, d denotes a center thickness of the collimating lens, and f denotes a focal length from the collimating lens to the light source, wherein the collimating lens is glass, and wherein a magnification ratio in a main scanning direction and a magnification in a sub scanning direction are substantially the same.

2. The beam scanning apparatus of claim 1, wherein the collimating lens has a positive refractive power.

3. The beam scanning apparatus of claim 1, wherein the slit is formed in an elliptical shape having a larger diameter in a main scanning direction than in a sub-scanning direction.

4. A beam scanning apparatus comprising:
a collimating lens in which a beam emitted from a light source is transformed into at least one of a convergent beam and a parallel beam with respect to an optical axis and outputted towards a slit, the collimating lens being one sheet of a spherical surface lens which comprises:
a first surface, opposing the light source, having a first curvature radius and a first positive constant refractive index;
a second surface, opposing the slit, having a second curvature radius and a second positive constant refractive index; and
a center thickness, wherein a length of the second curvature radius is between −0.3 and −0.1 times a length of the first curvature radius, and a length of the center thickness is between 0.05 and 0.5 times a focal length from the collimating lens to the light source wherein the collimating lens further comprises glass and preventing printing quality deterioration due to temperature change, and wherein a magnification ratio in a main scanning direction and a magnification in a sub scanning direction are substantially the same.

5. The beam scanning apparatus according to claim 4, wherein the collimating lens has a positive refractive power.

6. The beam scanning apparatus according to claim 4, wherein the slit is elliptical and has a larger diameter in a main scanning direction than in a sub-scanning direction.

7. A beam scanning apparatus comprising:
a collimating lens in which a beam emitted from a light source is transformed into at least one of a convergent beam and a parallel beam with respect to an optical axis and outputted towards a slit, the collimating lens being one sheet of a spherical surface lens which comprises:
a first surface, opposing a light source, having a first curvature radius and a first positive constant refractive index;
a second surface, opposing a slit, having a second curvature radius and a second positive constant refractive index;
a center thickness of the collimating lens; and
a focal length from the collimating lens to the light source, wherein the collimating lens is glass,
wherein a magnification ratio in a main scanning direction and a magnification in a sub scanning direction are substantially the same, and
wherein a length of the second curvature radius is between −0.3 and −0.1 times a length of the first curvature radius, and the length of the center thickness is between 0.05 and 0.5 times the focal length.

8. The beam scanning apparatus of claim 7, wherein the collimating lens has a positive refractive power.

9. The beam scanning apparatus of claim 7, wherein the slit is elliptical, the ellipse having a larger diameter in a main scanning direction than in a sub-scanning direction.

10. A beam scanning apparatus for use with a laser printer, comprising:
a laser diode to emit light;
a collimating lens, being one sheet of a spherical surface lens, including a first surface, opposing a light source and having a first curvature radius and a first positive constant refractive index, a second surface, opposing a slit that has a larger diameter in a scanning direction than in a sub-scanning direction and having a second curvature radius and a second positive constant refractive index, a center thickness, and a focal length from the collimating lens to the light source, wherein a length of the second curvature radius is between −0.3 and −0.1 times a length of the first curvature radius, and a length of the center thickness is between 0.05 and 0.5 times the focal length;
a cylinder lens in which light beams, passing therethrough, are transformed into linear shapes;
a rotating polygon mirror to move the horizontal linear beams from the cylinder lens at a constant linear velocity;
an f-theta lens having a constant refractivity with respect to the optical axis; and
a photosensitive drum on which image data is formed, wherein the collimating lens is glass, and
wherein a magnification ratio in a main scanning direction and a magnification in a sub scanning direction are substantially the same.

11. The beam scanning apparatus of claim 10, wherein the collimating lens has a positive refractive power.

12. The beam scanning apparatus of claim 10, wherein the slit is elliptical and has a larger diameter in a main scanning direction than in a sub-scanning direction.

13. A beam scanning apparatus for use with a laser printer with resolution ranging from 300 dots per inch to 600 dots per inch, comprising:
a laser diode to emit light;
a collimating lens, being one sheet of a spherical surface lens, including a first surface, opposing a light source and having a first curvature radius and a first positive constant refractive index, a second surface, opposing a slit that has a larger diameter in a scanning direction than in a sub-scanning direction and having a second curvature radius and a second positive constant refractive index, a center thickness of the collimating lens, and a focal length from the collimating lens to the light source;
a cylinder lens in which light beams, passing therethrough, are transformed into linear shapes;
a rotating polygon mirror to move the horizontal linear beams from the cylinder lens at a constant linear velocity;

an f-theta lens having a constant refractivity with respect to the optical axis; and a photosensitive drum on which image data is formed, wherein a magnification ratio in a main scanning direction and a magnification in a sub scanning direction are substantially the same, and wherein a length of the second curvature radius is between −0.3 and −0.1 times a length of the first curvature radius, and a length of the center thickness is between 0.05 and 0.5 times the focal length.

14. The beam scanning apparatus of claim 13, wherein the collimating lens has a positive refractive power.

15. The beam scanning apparatus of claim 13, wherein the slit is elliptical, the ellipse having a larger diameter in a main scanning direction than in a sub-scanning direction.

16. The beam scanning apparatus of claim 13, wherein the collimating lens is glass.

* * * * *